(12) United States Patent
Pedronno et al.

(10) Patent No.: US 6,739,658 B2
(45) Date of Patent: May 25, 2004

(54) VEHICLE SEAT

(75) Inventors: Philippe Pedronno, Marcoussis (FR); Claude Duboulet, Etrechy (FR)

(73) Assignee: Faurecia Seiges d'Automobile S.A., Nanterre (FR)

( * ) Notice: Subject to any disclaimer, the term of this patent is extended or adjusted under 35 U.S.C. 154(b) by 31 days.

(21) Appl. No.: 10/292,791

(22) Filed: Nov. 12, 2002

(65) Prior Publication Data

US 2003/0102701 A1 Jun. 5, 2003

(30) Foreign Application Priority Data

Dec. 3, 2001 (FR) .............................................. 01 15592

(51) Int. Cl.[7] ................................................ B60N 2/42
(52) U.S. Cl. .................................. 297/216.1; 297/284.11
(58) Field of Search ......................... 297/216.1, 216.13, 297/216.15, 284.11; 296/68.1

(56) References Cited

U.S. PATENT DOCUMENTS

| | | | |
|---|---|---|---|
| 5,125,472 A | | 6/1992 | Hara |
| 5,908,219 A | * | 6/1999 | Bohmler .................. 297/216.1 |
| 6,033,017 A | * | 3/2000 | Elqadah et al. .......... 297/216.1 |
| 6,050,635 A | | 4/2000 | Pajon et al. |
| 6,113,185 A | * | 9/2000 | Yamaguchi et al. ..... 297/216.1 |
| 6,254,181 B1 | * | 7/2001 | Aufrere et al. ......... 297/216.13 |
| 6,386,631 B1 | * | 5/2002 | Masuda et al. ......... 297/284.11 |
| 6,450,573 B1 | * | 9/2002 | Yamaguchi et al. ..... 297/216.1 |
| 6,648,409 B1 | * | 11/2003 | Laporte ................. 297/284.11 |
| 2001/0011810 A1 | * | 8/2001 | Saiguchi et al. ........... 296/68.1 |

FOREIGN PATENT DOCUMENTS

| | | |
|---|---|---|
| DE | 198 59 197.7 A1 | 12/1998 |
| EP | 0 965 479 A2 | 12/1999 |
| JP | 11103964 | 4/1999 |

OTHER PUBLICATIONS

International Search Report; French Search Report FR 0115592 issued Jul. 17, 2002.

* cited by examiner

Primary Examiner—Peter R. Crown
(74) Attorney, Agent, or Firm—Marshall, Gerstein & Borun LLP

(57) ABSTRACT

A vehicle seat comprising a seat back pivotally mounted on a seat proper to pivot about a transverse horizontal axis of rotation, the seat proper having a rigid framework which carries flexible padding and on which a support member is movably mounted to move vertically, the support member being adapted to form an abutment preventing the user of the seat from plunging into the padding downwards and forwards when the seat is subjected to high forward deceleration. The seat further comprises a coupling device connected to the support member and adapted to raise said support member when the seat back pivots backwards, and to lower the support member when the seat back pivots forwards.

5 Claims, 4 Drawing Sheets

VEHICLE SEAT

FIELD OF THE INVENTION

The present invention relates to vehicle seats.

More particularly, the invention relates to a vehicle seat comprising a seat proper and a seat back pivotally mounted on the seat proper to pivot about a transverse horizontal axis, said seat proper being made up of a rigid framework which carries flexible padding having a bearing face adapted to support a user sitting on the seat, the seat proper further including a support member that is substantially rigid, that is disposed under the bearing face of the padding, and that is mounted to move relative to the framework of the seat proper so that it can move at least vertically, said support member being adapted to form an abutment preventing the user of the seat from plunging into the padding downwards and forwards when the seat is subjected to high forward deceleration.

BACKGROUND OF THE INVENTION

Document U.S. Pat. No. 5,125,472 describes a seat of this type, in which the support member is moved upwards by an automatic actuator device when the vehicle in which the seat is installed is subjected to an accident.

However, that type of seat suffers from the drawback that, even though the support member rises into its active position extremely rapidly, the user of the seat starts to plunge into the padding of the seat proper while said member is rising, which reduces the effectiveness of that support member.

That drawback is even more significant when the back of the seat is tilted backwards to a large extent, because such a reclined position increases the risk of the user of the seat being thrown forwards by slipping under the lap segment of the seatbelt that the user is wearing, and by plunging at least partially into the padding of the seat proper.

OBJECTS AND SUMMARY OF THE INVENTION

A particular object of the present invention is to mitigate those drawbacks.

To this end, in the invention, a seat of the type in question further comprises a coupling device connected to the support member and adapted to raise said support member when the seat back pivots backwards, and to lower the support member when the seat back pivots forwards.

By means of these provisions, the support member may be continuously positioned optimally so as to ensure both that the user of the seat is comfortable, and that said user is protected from any frontal impacts to which the vehicle might be subjected. In particular, when the back of the seat is tilted backwards to the maximum extent, the support member is raised to the maximum extent, and thus offers the most effective protection possible for preventing the passenger in the seat from being thrown forwards by slipping under the lap segment of the seatbelt that said passenger is wearing.

In preferred embodiments of the invention, any of the following provisions may optionally be used:

- the coupling device connects the back of the seat to the support member;
- the support member is carried by two side arms pivotally mounted on the framework of the seat proper on either side of said seat proper to pivot about a transverse horizontal axis of rotation, the coupling device comprising two links, each of which is pivotally mounted on the seat back and on one of said side arms, the links being disposed so that the seat back pivoting backwards raises the support member and so that the seat back pivoting forwards lowers said support member;
- each side arm extends forwards from the axis of rotation of said side arm to the support member, and is provided with a lever arm that extends downwards from said axis of rotation of the side arm, said lever arm being connected pivotally to one of the links and said link also being connected pivotally to the seat back below the axis of rotation of said seat back; and
- the support member comprises a support plate which extends transversely under the padding of the seat proper in the vicinity of the front of said seat proper.

BRIEF DESCRIPTION OF THE DRAWINGS

Other characteristics and advantages of the invention appear from the following description of an embodiment of it, given by way of non-limiting example, and with reference to the accompanying drawings.

In the drawings.

MORE DETAILED DESCRIPTION

In the various figures, like references designate identical or similar elements.

Figure 1:
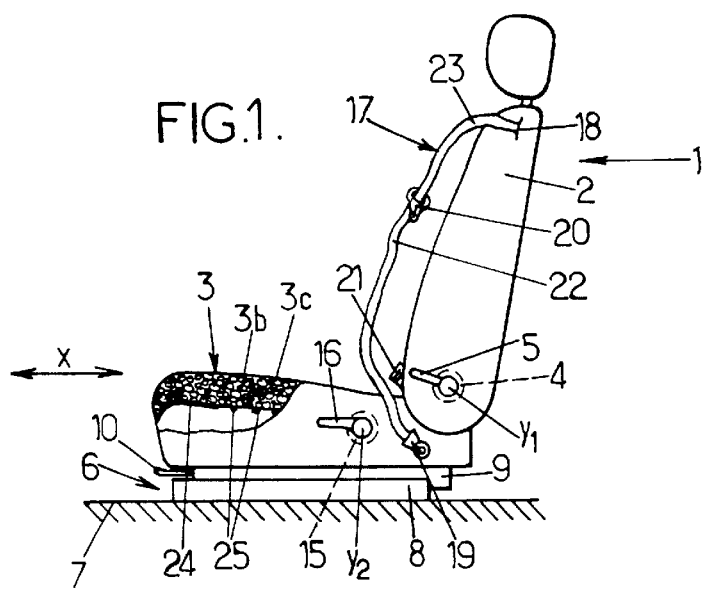
FIG. 1 is a diagrammatic view of a vehicle seat in an embodiment of the invention.

FIG. 1 shows a motor vehicle seat 1, in particular a front seat and advantageously a passenger seat. The seat has a seat back 2 which is mounted on a seat proper 3 to pivot about a transverse horizontal axis Y1, so that the inclination of the seat back can be adjusted by a user by means of at least one hinge mechanism 4 that is known per se.

The hinge mechanism 4 may, for example, be a mechanism adapted for selectively locking the seat back to prevent it from pivoting about the axis Y1 or releasing the seat back to enable it to pivot about said axis, as a function of actuation of a handle 5. In which case, when a user sitting on the seat wishes to tilt the seat back 2 backwards, the user leans back against the seat back, and when the user wishes to tilt the seat back 2 forwards, the user leans forward to enable the seat back 2 to pivot forwards under the action of internal resilient means such as coiled springs 2b (FIG. 2) or torsion bars. An example of a hinge mechanism of this type is given, inter alia, in Document FR-A-2 801 850.

In a variant, the hinge mechanism could be a gear mechanism controlled by the handle 5 or by some other actuator member, or else controlled by an electric motor incorporated in the seat. An example of such a gear hinge mechanism is given, inter alia, in Document FR-A-2 759 333.

The seat proper 3 is mounted on a base 6 which stands on the floor 7 of the vehicle. The base 6 makes it possible for the seat proper 3 to slide along the longitudinal axis X forwards and backwards. To this end, in the example shown, the base 6 comprises:

two fixed metal rails 8 extending longitudinally along the axis X on either side of the seat proper, each of the rails 8 being fixed rigidly to the floor 7;

two metal support cheek plates 9 mounted to slide along respective ones of the two fixed rails 8; and a locking device, known per se, which can be controlled, for example, by a yoke bar 10 accessible under the front of the seat proper 3.

Figure 2:
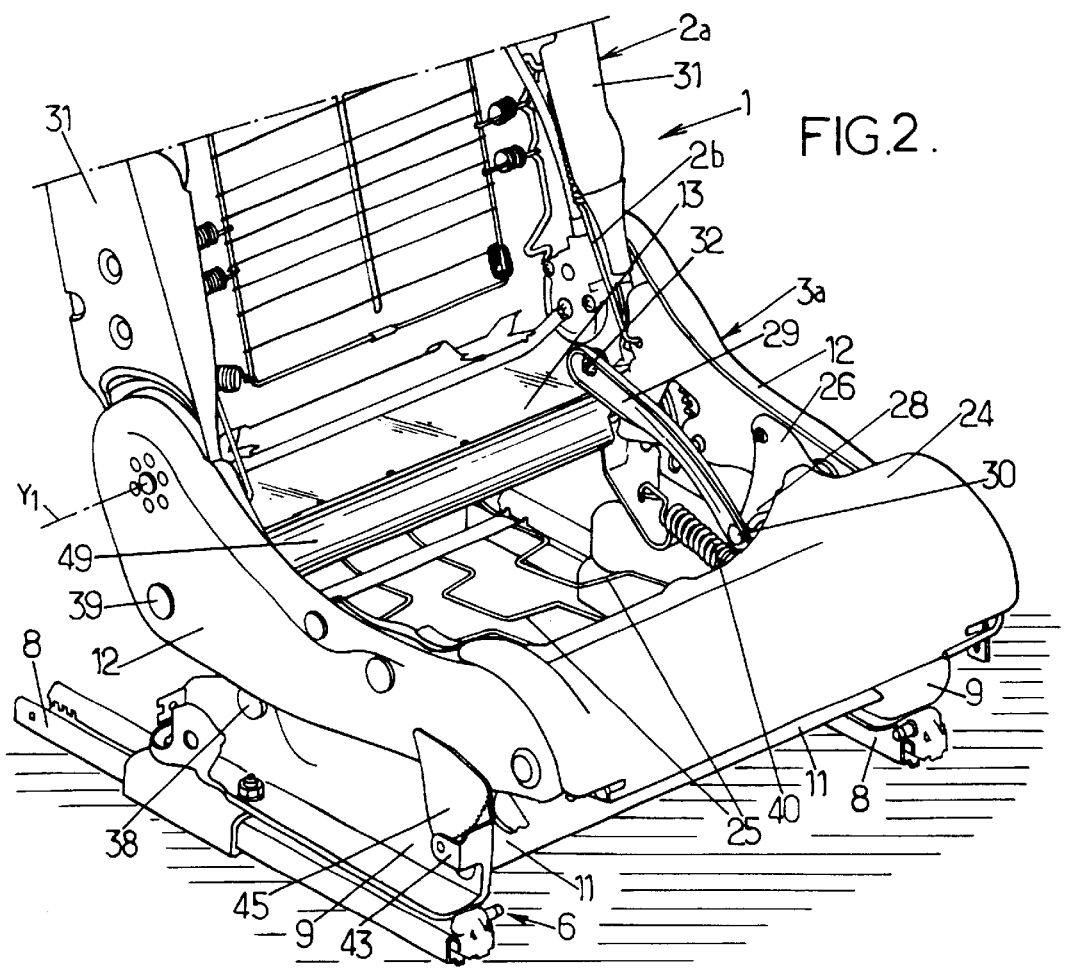
FIG. 2 is a fragmentary perspective view of the framework of the seat of FIG. 1.

The two support cheek plates 9 of the base 6 are interconnected via one or more crosspieces 11, one of which can be seen in FIG. 2.

In addition, as can be seen in FIG. 2, the framework 3a of the seat proper is made up of two metal side cheek plates 12 which are themselves interconnected via crosspieces 13, one of which can be seen in FIG. 2.

The framework 3a of the seat proper is connected to the support cheek plates 9 of the base via a raising mechanism 14 which is described in more detail below and which is controlled, for example, by a control mechanism 15 (FIG. 1) actuated by means of a handle 16 or the like which is mounted to pivot about a transverse horizontal axis of rotation Y2. The control mechanism 15 may, for example by of the type described in Document FR-A-2 792 264.

In addition, as shown in FIG. 1, the seat 1 may be provided with a seatbelt 17 which is connected to the top portion of the seat back 2 of the seat at a top anchor point 18 which may, for example, consist of a slidably mounted guide from which the seatbelt 17 extends into the seat back 2 to a seatbelt reel (not shown), which reel may optionally be disposed at a location remote from the anchor point 18.

The seatbelt 17 is also fixed, e.g. to one of the support cheek plates 9 of the base, by means of a fastening 19, and said seatbelt 17 is further provided with a buckle 20 adapted to fasten removably in a seatbelt latch 21 fixed, for example, to the support cheek plate 9 situated opposite from the support cheek plate 9 that carries the fastening 19.

The seatbelt 17 thus forms a lap segment 22 that extends between the buckle 20 and the fastening 19, and a top segment 23 that extends between the buckle and the top anchor point 18.

In addition, as shown in FIG. 2, at its front end, the framework 3a of the seat further includes a substantially rigid support member 24 which, in this example, is in the form of a sheet metal plate that can be seen clearly in FIGS. 1 and 2. This plate 24 is disposed under padding 3b of synthetic foam or the like (see FIG. 1), which padding 3b is also supported by a layer of elastic threads 25 and forms a top bearing face covered by a covering of trim 3c made of a woven fabric, of leather, or of some other material.

The support plate 24 is disposed to serve as an abutment for the thighs and buttocks of a user sitting on the seat when the vehicle in which the seat is installed is subjected to an accident with frontal impact, so that the user cannot be thrown forwards by plunging into the padding 3b of the seat proper and by slipping under the lap segment 22 of the seatbelt worn by the user.

Figure 3:
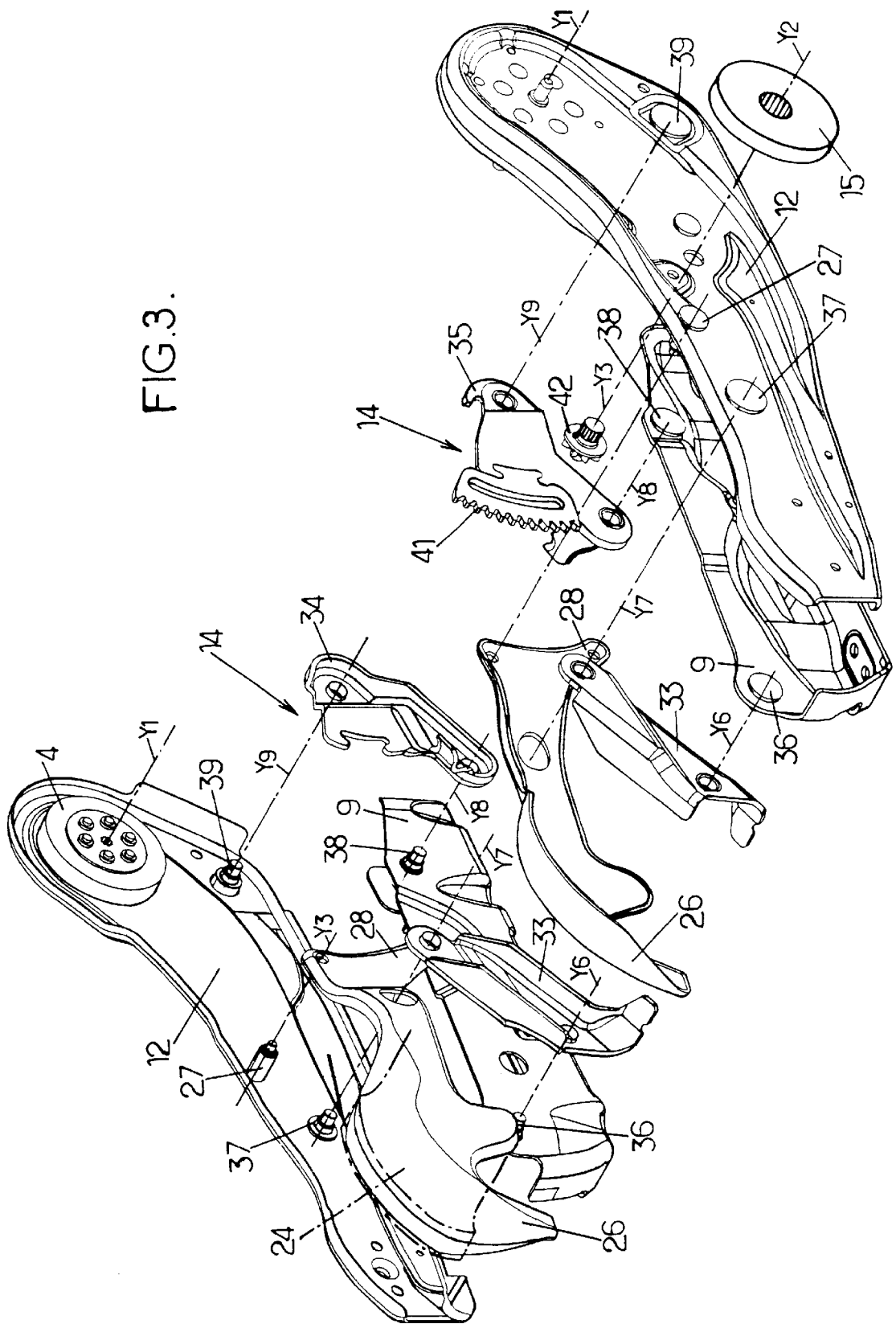
FIG. 3 is a fragmentary exploded view of the seat proper of the seat of FIG. 2.
Figure 4:
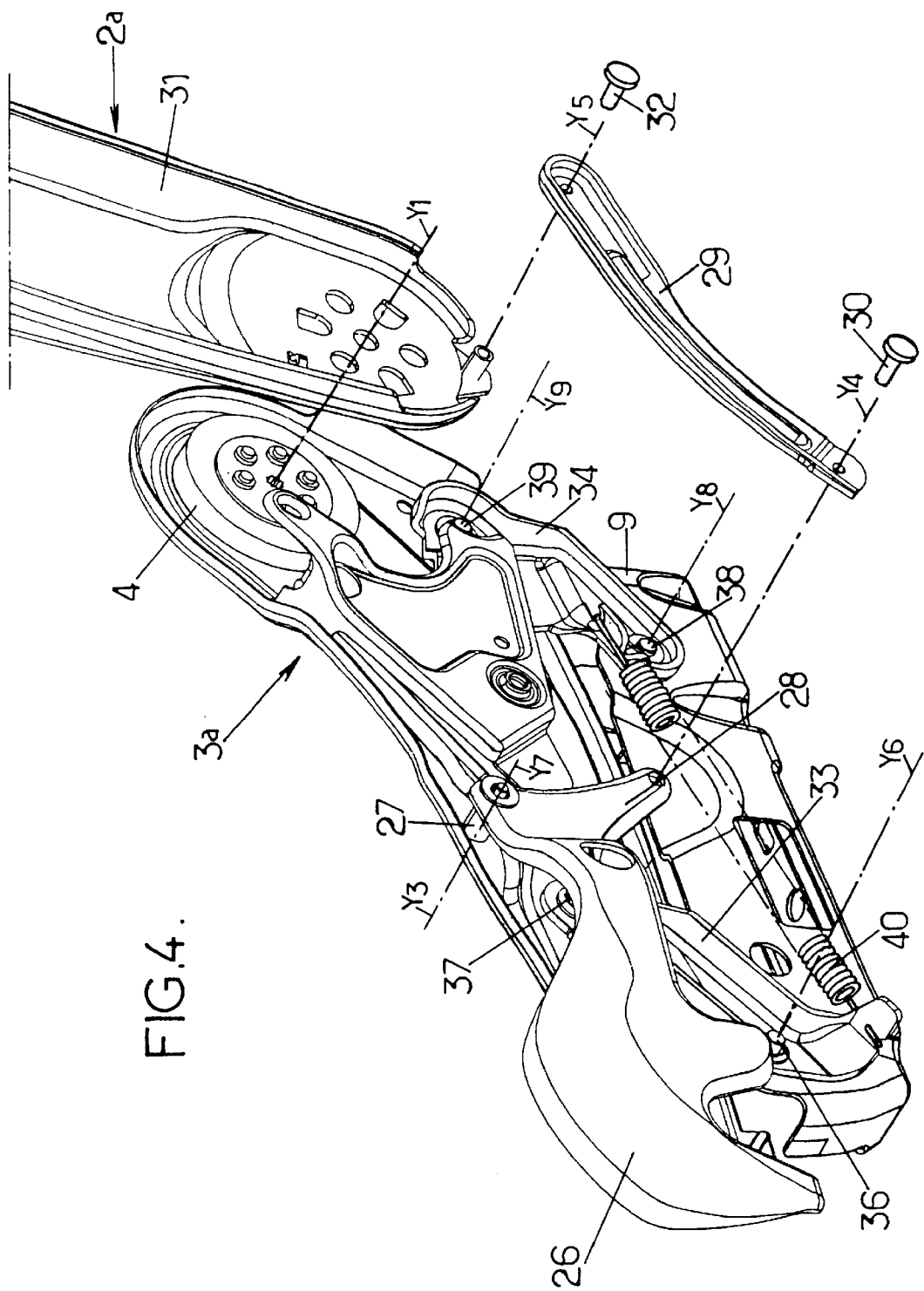
FIG. 4 is an exploded fragmentary view of one of the sides of the seat proper of the seat of FIG. 2, seen from inside the seat.

The support plate 24 is supported by two rigid side arms 26 which may, for example, be made of cut-out and stamped sheet metal, and which can be seen clearly in FIGS. 3 and 4.

Each of the side arms 26 extends parallel to the cheek plates 12 of the framework of the seat proper and is pivotally mounted at its rear end on one of said side cheek plates 12 to pivot about a transverse horizontal axis Y3 by means of a pivot 27.

In addition, each side arm 26 is extended downwards at its rear end via a lever arm 28 which is pivotally mounted on one end of a link 29 made of stamped sheet metal, by means of a pivot 30 which defines a transverse horizontal axis of rotation Y4, as can be seen in FIG. 4.

The other end of the link 29 is pivotally mounted on the bottom end of the corresponding cheek plate 31 that is part of the framework 2a of the seat back by means of a pivot 32 that defines a transverse horizontal axis Y5 (FIG. 4).

Thus, when the user of the seat tilts the seat back 2 backwards about the axis Y1, the seat back tilting pushes the links 29 forwards, and said links cause the side arms 26 to pivot about the axis Y3, thereby raising the support plate 24 fixed to the front end of said arms.

By means of these provisions, the safety of the user of seat is improved when the vehicle is subjected to frontal impacts. The further the seat back 2 is tilted backwards, the greater the risk of the user being thrown forward by slipping under the lap segment 22 of the seatbelt worn by the user, and of the user plunging into the padding 3b of the seat proper under the effect of a high forward acceleration. But, by means of these provisions, that risk is countered by the support plate 24 rising.

FIGS. 3 and 4 also show in detail the raising mechanism 14 which makes it possible to move the seat proper 2 upwards or downwards.

In the example in question, the raising mechanism is made up of four links distributed in two pairs of links, each pair comprising a front link 33 and a rear link 34, 35, all of the links being made of cut-out and stamped sheet metal, for example.

Each of the two front links 33 is pivotally mounted at one end on a respective one of the support cheek plates 9 to pivot about a respective pivot 36 defining a transverse horizontal axis of rotation Y6, and at the other end on the corresponding side cheek plate 12 of the seat proper by means of a respective pivot 37 defining a transverse horizontal axis of rotation Y7.

In addition, each rear link 34, 35 is pivotally mounted at one end on a respective support cheek plate 9 by means of a respective pivot 38 defining a transverse horizontal axis of rotation Y8, and at the other end on the corresponding cheek plate 12 by means of a respective pivot 39 defining a transverse horizontal axis Y9.

The various links 33, 34, 35 are angularly positioned so that their top pivots are disposed higher and further back than their bottom pivots, and each link 33 is connected to the corresponding rear link 34 via a spring 40 working in traction, and that is clearly visible in FIGS. 2 and 4.

In addition, the rear links 34, 35 are interconnected by a rigid coupling bar 49 that is secured to said links. Likewise, the front links 33 are coupled together by a similar coupling bar (not shown).

In a manner known per se, the spring tends to raise the links 33, 34 so as to compensate, at least in part, for the weight of the user, thereby lightening the weight on the control mechanism 15 when adjusting the height of the seat proper.

As shown in FIG. 3, the rear link 35 is further provided with a set of teeth 41 extending over a circular arc centered on the axis of rotation Y9, the set of teeth meshing with a sprocket 42. The sprocket 42 is mounted to pivot relative to the corresponding side cheek plate 12 about the axis Y2, and is connected to the control mechanism 15 so as to be driven by the control mechanism when the handle 16 is actuated, thereby making it possible to control the raising mechanism 14.

It should be noted that, instead of being controlled by a mechanism 15 of the type described in Document FR-A-2 792 264, as mentioned above, the raising mechanism 14 may optionally be controlled merely by a locking device for selectively locking or unlocking the link 35.

In which case, the height of the seat proper 3 is adjusted merely by unlocking the link 25, and by allowing the seat proper to rise freely upwards under the action of the springs 40 (for this purpose, the user leans on the steering wheel, for example, so as to lighten the weight on the seat proper). Conversely, to lower the seat proper, the user applies his or her full weight to it while releasing the links of the raising mechanism 14.

In any event, the raising mechanism 14 imparts some flexibility to the coupling between the seat proper 3 and the base 6, and this flexibility tends to enable the seat proper 3 to tip forwards to a certain extent when the vehicle in which the seat is installed undergoes acceleration that is high (in absolute terms), due to a frontal impact, for example.

This tendency to tip is particularly accentuated when the seatbelt 17 of the seat 1 has its top anchor point 18 at the top portion of the seat back 2, as it does in the example considered herein.

But in all cases, even when the seatbelt 17 is not fixed to the top portion of the seat back 2, the seat proper 3 is always subjected to high stresses that tend to tip it forwards when the vehicle is subjected to a frontal impact. Such stresses are due, in particular, to the thighs of the user pressing against the above-mentioned support plate 24 or against any other rigid cross-member situated in the vicinity of the front of the seat proper, and said stresses may also be due to impacts applied to the rear of the seat back 2 by luggage or by people sitting on the back seat and who have not fastened their seatbelts.

The stresses in question would tend to give rise to linear and angular displacements of the seat proper 3 that are relatively large.

Figure 5:
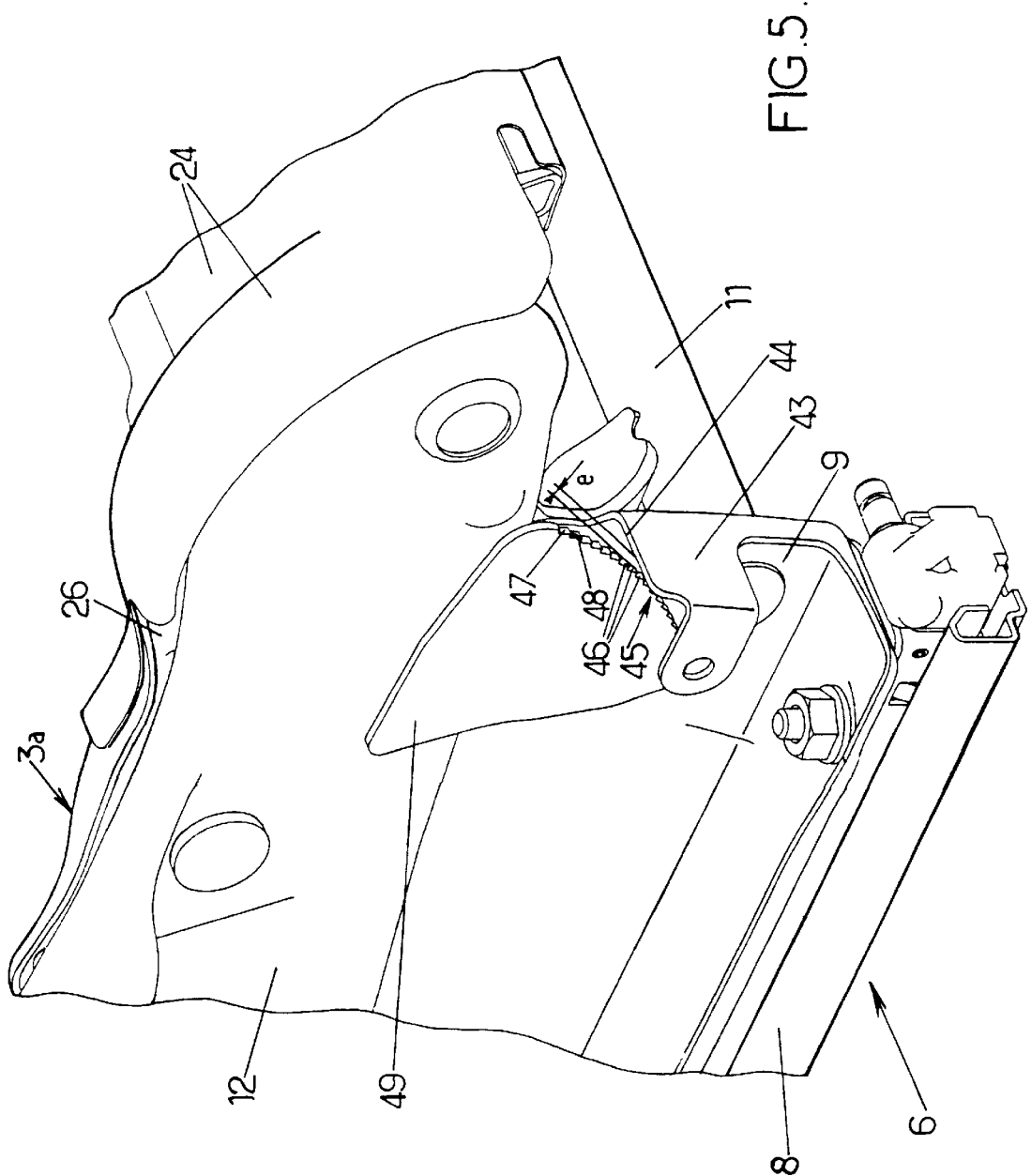
FIG. 5 is a detail view of one of the sides of the seat proper of the seat of FIG. 2, seen from outside the seat.

To avoid that drawback, and as shown in FIG. 5, the seat 1 advantageously includes the following on each of its sides:

an abutment 43 constituted in this example by a folded-over tab formed integrally with the corresponding support cheek plate 9, the folded-over tab having a top edge 44 which extends horizontally along a transverse axis, i.e. parallel to the axes Y1–Y9; and a curved set of teeth 45 which is made up of a plurality of teeth 46, each of which has a face 47 facing substantially forwards and a face 48 facing substantially downwards, the set of teeth 45 being formed, for example, along the front edge of a sheet metal plate 49 secured to the corresponding side cheek plate 12 (the plate of sheet metal 49 may be fixed to the cheek plate 12, in particular by welding, or else said plate of sheet metal 49 could be formed integrally with the corresponding cheek plate 12).

The set of teeth 45 is separated from the top edge 44 of the folded-over tab 43 by a short distance e lying in the range 2 millimeters (mm) to 5 mm, and advantageously about 3 mm In addition, the outline of the set of teeth 45 is advantageously chosen so as to extend parallel to the path followed by a point of said set of teeth while the height of the seat proper 3 is being adjusted by means of the raising mechanism 14. Thus, the distance e between the set of teeth 45 and the top edge 44 of the tab 43 remains substantially constant regardless of the setting of the raising mechanism 14.

The set of teeth 45 is disposed behind and higher than the top edge 44 of the tab 43 so that, when the seat proper 3 tends to pivot forwards due to the relative flexibility of the raising mechanism 14, the teeth 46 of the set of teeth 45 come into engagement on the top edge 44 of the tab 43, thereby limiting the movements of the seat proper 3.

By means of these provisions, it is possible to offer safety for the user of the seat by using means that are simple and inexpensive, and without having to use links 33, 34, 35 that are specially reinforced and that could be both heavy and costly.

It should be noted that the set of teeth 45 could be associated with the support cheek plate 9, and the tab 43 or any other such abutment could be associated with the side cheek plate 12.

In addition, the sets of teeth 45 and the corresponding abutments 43 could also be provided both at the front and at the rear of the seat, or optionally at the rear of the seat only, so as to prevent the seat from tipping backwards, in particular in the event that the vehicle is subjected to an impact from the rear.

Naturally, the invention is not limited to the above-described embodiment, and, in particular, the tabs 43 and the sets of teeth 45 could be omitted, and the seatbelt 17 incorporated into the seat could be replaced by a seatbelt having at least its top anchor point fixed to the body of the vehicle.

What is claimed is:

1. A vehicle seat comprising a seat proper and a seat back pivotally mounted on the seat proper to pivot about a transverse horizontal axis, said seat proper being made up of a rigid framework which carries flexible padding having a bearing face adapted to support a user sitting on the seat, the seat proper further including a support member that is substantially rigid, that is disposed under the bearing face of the padding, and that is mounted to move relative to the framework of the seat proper so that it can move at least vertically, said support member being adapted to form an abutment preventing the user of the seat from plunging into the padding downwards and forwards when the seat is subjected to high forward deceleration;

said vehicle seat further comprising a coupling device connected to the support member and adapted to raise said support member when the seat back pivots backwards, and to lower the support member when the seat back pivots forwards.

2. A seat according to claim 1, in which the coupling device connects the back of the seat to the support member.

3. A seat according to claim 2, in which the support member is carried by two side arms pivotally mounted on the framework of the seat proper on either side of said seat proper to pivot about a transverse horizontal axis of rotation, the coupling device comprising two links, each of which is pivotally mounted on the seat back and on one of said side arms, the links being disposed so that the seat back pivoting backwards raises the support member and so that the seat back pivoting forwards lowers said support member.

4. A seat according to claim 3, in which each side arm extends forwards from the axis of rotation of said side arm to the support member, and is provided with a lever arm that extends downwards from said axis of rotation of the side arm, said lever arm being connected pivotally to one of the links and said link also being connected pivotally to the seat back below the axis of rotation of said seat back.

5. A seat according to claim 1, in which the support member comprises a support plate which extends transversely under the padding of the seat proper in the vicinity of the front of said seat proper.

* * * * *